US011181399B2

(12) United States Patent
Koike et al.

(10) Patent No.: US 11,181,399 B2
(45) Date of Patent: Nov. 23, 2021

(54) MAGNETIC ENCODER, AND PRODUCTION METHOD THEREFOR

(71) Applicant: NTN CORPORATION, Osaka (JP)

(72) Inventors: Takashi Koike, Iwata (JP); Yasuyuki Fukushima, Iwata (JP); Yuya Yamaguchi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/521,088

(22) Filed: Jul. 24, 2019

(65) Prior Publication Data
US 2019/0346289 A1 Nov. 14, 2019

Related U.S. Application Data

(63) Continuation of application No. PCT/JP2018/002829, filed on Jan. 30, 2018.

(30) Foreign Application Priority Data

Feb. 2, 2017 (JP) .............................. JP2017-017346

(51) Int. Cl.
G01D 5/245 (2006.01)
(52) U.S. Cl.
CPC .................... G01D 5/245 (2013.01)
(58) Field of Classification Search
CPC ................. G01D 5/245; G01D 5/14
See application file for complete search history.

(56) References Cited

U.S. PATENT DOCUMENTS

| 6,823,725 B2 | 11/2004 | Lohberg |
| 7,095,575 B2 | 8/2006 | Miyata et al. |
| 7,106,053 B2 | 9/2006 | Desbiolles |
| 7,237,960 B2 * | 7/2007 | Oohira .................. F16C 41/007 384/448 |
| 7,307,414 B2 | 12/2007 | Ito |

(Continued)

FOREIGN PATENT DOCUMENTS

| CN | 1591584 | 3/2005 |
| CN | 101846531 A | 9/2010 |

(Continued)

OTHER PUBLICATIONS

English Translation by WIPO of the International Preliminary Report on Patentability dated Aug. 15, 2019 in corresponding International Patent Application No. PCT/JP2018/002829.

(Continued)

Primary Examiner — Reena Aurora

(57) ABSTRACT

The magnetic encoder includes: a core member of annular shape having a press-fitting portion which bends and extends from an edge of a track formation surface, and to which a rotary shaft is press-fitted and fixed; and two or more rows of magnetic tracks arranged adjacent to each other on a magnetic member provided on the track formation surface, each track having N poles and S poles alternately magnetized thereon. The two or more rows of magnetic tracks include a main track that has a largest number of magnetic poles and is used for calculating an angle of rotation, and a sub track used for calculating a phase difference from the main track. The main track is located on a side more distant from the press-fitting portion than the sub track.

11 Claims, 6 Drawing Sheets

(56) References Cited

U.S. PATENT DOCUMENTS

| | | | |
|---|---|---|---|
| 8,436,705 | B2 | 5/2013 | Takahashi et al. |
| 9,250,102 | B2* | 2/2016 | Takahashi .......... G01D 5/24438 |
| 9,464,919 | B2* | 10/2016 | Sugino .................... G01D 5/20 |
| 9,691,534 | B2 | 6/2017 | Takahashi et al. |
| 9,976,874 | B2 | 5/2018 | Takahashi et al. |
| 2004/0113382 | A1 | 6/2004 | Desbiolles |
| 2005/0052767 | A1 | 3/2005 | Miyata et al. |
| 2005/0218884 | A1 | 10/2005 | Koike et al. |
| 2007/0205759 | A1 | 9/2007 | Ito |
| 2011/0101964 | A1 | 5/2011 | Ausserlechner et al. |
| 2011/0291780 | A1 | 12/2011 | Takahashi et al. |
| 2012/0105055 | A1 | 5/2012 | Takahashi et al. |
| 2013/0063138 | A1 | 3/2013 | Takahashi et al. |
| 2015/0243427 | A1 | 8/2015 | Takahashi et al. |
| 2016/0146630 | A1 | 5/2016 | Takahashi et al. |
| 2016/0282145 | A1 | 9/2016 | Ueda et al. |
| 2019/0346291 | A1 | 11/2019 | Koike et al. |
| 2019/0346292 | A1 | 11/2019 | Koike et al. |

FOREIGN PATENT DOCUMENTS

| | | | |
|---|---|---|---|
| CN | 102472607 | | 5/2012 |
| CN | 102933940 | | 2/2013 |
| CN | 104541134 | A | 4/2015 |
| CN | 105408725 | A | 3/2016 |
| CN | 106225813 | A | 12/2016 |
| EP | 1 353 151 | A1 | 10/2003 |
| JP | 9-311053 | | 12/1997 |
| JP | 2004-271506 | | 9/2004 |
| JP | 2007-232589 | | 9/2007 |
| JP | 2010-186794 | | 8/2010 |
| JP | 2011-7709 | | 1/2011 |
| JP | 2011-112471 | | 6/2011 |
| JP | 2011-252826 | | 12/2011 |
| JP | 2014-38939 | | 2/2014 |
| JP | 2015-21741 | | 2/2015 |
| JP | 2015-75466 | | 4/2015 |
| JP | 5973278 | | 8/2016 |
| WO | 2011/152266 | | 12/2011 |

OTHER PUBLICATIONS

International Search Report dated May 1, 2018 in corresponding International Patent Application No. PCT/JP2018/002829.
U.S. Appl. No. 16/521,116, filed Jul. 24, 2019, Takashi Koike et al., NTN Corporation.
U.S. Appl. No. 16/521,092, filed Jul. 24, 2019, Takashi Koike et al., NTN Corporation.
U.S. Notice of Allowance dated May 7, 2021, in U.S. Appl. No. 16/521,092, 13 pages.
Office Action dated Dec. 1, 2020, in Chinese Patent Application No. 201880009663.6 with machine translation (15 pages including machine translation).
U.S. Office Action dated Jan. 15, 2021, in U.S. Appl. No. 16/521,092 (9 pages).
U.S. Office Action dated Jan. 21, 2021, in U.S. Appl. No. 16/521,116 (13 pages).
Japanese Office Action dated Mar. 9, 2021, in Japanese Patent Application No. 2017-017322 (6 pages including translation).
Japanese Office Action dated Mar. 16, 2021, in Japanese Patent Application No. 2017-017346 (6 pages including translation).
Office Action issued in Chinese Patent Application No. 201880009663.6 dated Aug. 6, 2021 (12 pages including translation).
Office Action issued in Chinese Patent Application No. 201880009660.2 dated Aug. 24, 2021 (26 pages including translation).

* cited by examiner (a)

(b)

MAGNETIC ENCODER, AND PRODUCTION METHOD THEREFOR

CROSS REFERENCE TO THE RELATED APPLICATION

This application is a continuation application, under 35 U.S.C. § 111(a), of international application No. PCT/JP2018/002829, filed Jan. 30, 2018, which is based on and claims Convention priority to Japanese patent application No. 2017-017346, filed Feb. 2, 2017, the entire disclosure of which is herein incorporated by reference as a part of this application.

BACKGROUND OF THE INVENTION

Field of the Invention

The present invention relates to a magnetic encoder used for detecting a rotation speed or a rotation position, and a production method therefor. In particular, the present invention relates to a technique applicable to: a magnetic encoder having a plurality of rows of magnetic tracks that are used for detecting an absolute angle; and a production method therefor.

Description of Related Art

Patent Document 1 proposes a magnetic encoder in which, when magnetization of a plurality of circumferential rows of magnetic encoder tracks is performed, flow of a magnetic flux to the rows of magnetic encoder tracks other than a magnetization target row is shielded by use of a magnetic shield.

RELATED DOCUMENT

Patent Document

[Patent Document 1] Japanese Patent No. 5973278

SUMMARY OF THE INVENTION

In the magnetic encoder described in Patent Document 1, a difference of one pole pair is provided between the respective magnetic tracks. Thus, the magnetic encoder can be used for detecting an absolute angle. However, the magnetic track (main track) that serves as a reference for angle detection is required to have a high magnetization accuracy. For example, in a case where an absolute angle is detected by using two rows of magnetic tracks respectively magnetized with 32 pole pairs and 31 pole pairs, an angle per pole pair, on the 32-pole-pairs side, is 11.25° (360/32). In order to determine the present phase position, a magnetization accuracy of not more than 0.35° (11.25/32), or, for the sake of safety, a magnetization accuracy within ±0.1°, is required. If the number of magnetic poles is increased to be, for example, 64 pole pairs and 63 pole pairs, the required accuracy becomes higher. For example, a magnetization accuracy within ±0.04° is required.

Meanwhile, a core member of a magnetic encoder has a press-fitting portion that is formed bent. When a rotary shaft is press-fitted and fixed to the press-fitting portion, deformation of the core member may occur, which may reduce pitch accuracy of the magnetic track. Therefore, it is difficult to produce a magnetic encoder that satisfies required accuracy.

Therefore, an object of the present invention is to provide: a magnetic encoder, having a plurality of rows of magnetic tracks and capable of detecting an absolute angle, which is less likely to be affected by accuracy reduction caused by a mounting work through press-fitting, which can detect an absolute angle with higher accuracy, and which can be easily produced; and a method for producing the magnetic encoder.

A magnetic encoder according to the present invention includes: an annular core member, or a core member of annular shape, having a track formation surface and a press-fitting portion to which a rotary shaft is press-fitted and fixed, the press-fitting portion bending and extending from an edge of the track formation surface; and two or more rows of magnetic tracks arranged adjacent to each other on a magnetic member provided on the track formation surface of the core member, each track having N poles and S poles alternately magnetized thereon. The two or more rows of magnetic tracks include a main track that has a largest number of magnetic poles and is used for calculating an angle of rotation, and a sub track used for calculating a phase difference from the main track. The main track is located on a side more distant from the press-fitting portion than the sub track. The magnetic member may be a single member used for both the main track and the sub track, or a plurality of magnetic members may be individually provided for the respective magnetic tracks.

When the magnetic encoder is mounted to the rotary shaft, since the press-fitting portion is press-fitted to the rotary shaft, the core member may be deformed, which may reduce the accuracy of the magnetic track. However, since the main track, which is the magnetic track that has the larger number of magnetic poles and is required to have high accuracy, is disposed on the side distant from the press-fitting portion, reduction in the pitch accuracy of the main track due to deformation of the core member is relatively little. Thus, improvement and stabilization of the accuracy of the detected angle are expected. Since the sub track is a magnetic track used for calculating a phase difference from the main track, influence of the accuracy of the magnetization pitch thereof is relatively small. Therefore, the magnetic encoder is rendered to be able to detect an absolute angle with high accuracy within a limited range of accuracy in production, by simply adjusting the arrangement of the main track and the sub track.

In the magnetic encoder of the present invention, the core member has: a cylindrical portion having an outer peripheral surface that serves as the track formation surface; and has the press-fitting portion. The press-fitting portion may be composed of: a stepped portion that bends from the cylindrical portion toward an inner diameter side; and an inner-diameter press-fitting portion that extends from an inner-diameter-side edge of the stepped portion to a side opposite to the cylindrical portion, concentrically with the cylindrical portion, and that allows the rotary shaft to be press-fitted and fixed thereto. The magnetic encoder may be a so-called radial type. A radial type magnetic encoder can also be easily produced while improving the accuracy.

In the magnetic encoder of the present invention, the core member has: an annular or ring plate portion, or a plate portion of annular or ring shape, having one surface that serves as the track formation surface; and the press-fitting portion. The press-fitting portion may bend and extend from an inner-diameter-side edge of the plate portion to a side opposite to the track formation surface. The magnetic encoder may be a so-called axial type. An axial type magnetic encoder can also be easily produced while improving the accuracy.

In the magnetic encoder of the present invention, accuracy of pitch of magnetic poles may be higher in the main track than in the sub track. The "accuracy" is a difference between an actual pitch and a theoretical pitch. For example, assuming that a magnetic track is magnetized with 32 pole pairs, an angle per pole pair is theoretically 11.25°. Then, if the angle of a certain pole pair is 11.3° in actuality, the actual pitch is 11.3° whereas the theoretical pitch is 11.25°. Generally, as for a magnetic encoder, an un-magnetized magnetic encoder is produced in advance, and thereafter, magnetization is performed on the un-magnetized magnetic encoder. In this case, a plurality of magnetic tracks are sequentially magnetized. A magnetic track that has been magnetized first is assumed to be reduced in accuracy due to leakage of a magnetic flux when a subsequent magnetic track is magnetized. Therefore, it is difficult to magnetize, with high accuracy, all the magnetic tracks arranged adjacent to each other.

Therefore, in the magnetic encoder of the present invention, a magnetic track, whose accuracy of pitch of magnetic poles is assumed to be reduced, is regarded as a sub track. Since the sub track is a magnetic track used for calculating a phase difference from the main track, influence of the accuracy of the magnetization pitch thereof becomes relatively little by adopting the aforementioned magnetization order. Therefore, if the accuracy of the magnetization pitch of the main track, which has the larger number of magnetic poles and is used for calculating an angle, is made higher than that of the sub track, the magnetic encoder becomes able to detect an absolute angle with high accuracy within a limited range of accuracy in production. Preferably, the number of magnetic poles of the main track is larger by one than the number of magnetic poles of the sub track. It is noted that this magnetic encoder is applicable not only to a magnetic encoder in which magnetizations for the respective magnetic tracks are successively performed but also to general magnetic encoders in which a difference in accuracy occurs between magnetic tracks.

A magnetic encoder production method according to the present invention is a method for producing a magnetic encoder having any of the aforementioned configurations. The method includes: producing an un-magnetized magnetic encoder in which the magnetic member is provided on an outer periphery of the core member; and sequentially magnetizing the respective rows of magnetic tracks in such a manner that, during the magnetization, N poles and S poles are alternately magnetized one by one while shielding, with a magnetic shield member, a magnetic track or a portion to be a magnetic track, which is not currently being magnetized.

As described above, since the N poles and the S poles are alternately magnetized one by one while shielding, with the magnetic shield, a portion to be a magnetic track on a side that is not currently being magnetized, influence of leakage of a magnetic flux is minimized, whereby magnetization with relatively high accuracy can be performed. Therefore, it is possible to produce, with higher accuracy, the magnetic encoder of the present invention in which the main track is formed on the side distant from the press-fitting portion assumed to be deformed during press-fitting of the core member, and which can detect an absolute angle with high accuracy. In addition, the magnetic encoder can be produced by simple modification of an existing production method with configurations mentioned above.

In the magnetic encoder production method of the present invention, the main track may be magnetized after the sub track has been magnetized. Although degradation in accuracy may be caused by leakage of a magnetic flux during magnetization of a magnetic track as described above, since the main track having the larger number of magnetic pole pairs that affect the angular accuracy is magnetized last in the magnetization order, degradation in accuracy of the main track is inhibited, and an absolute angle can be detected with high accuracy.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
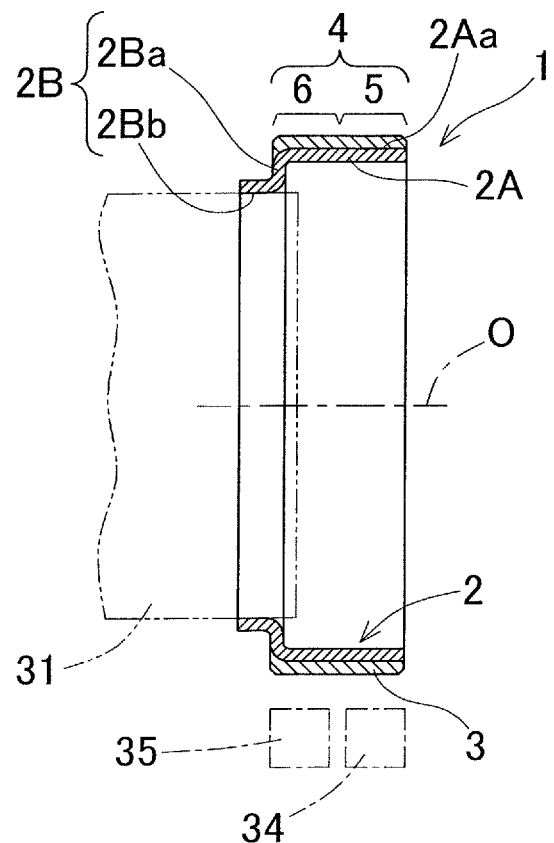
FIG. 1 is a longitudinal-sectional view of a magnetic encoder according to a first embodiment of the present invention.
Figure 2:
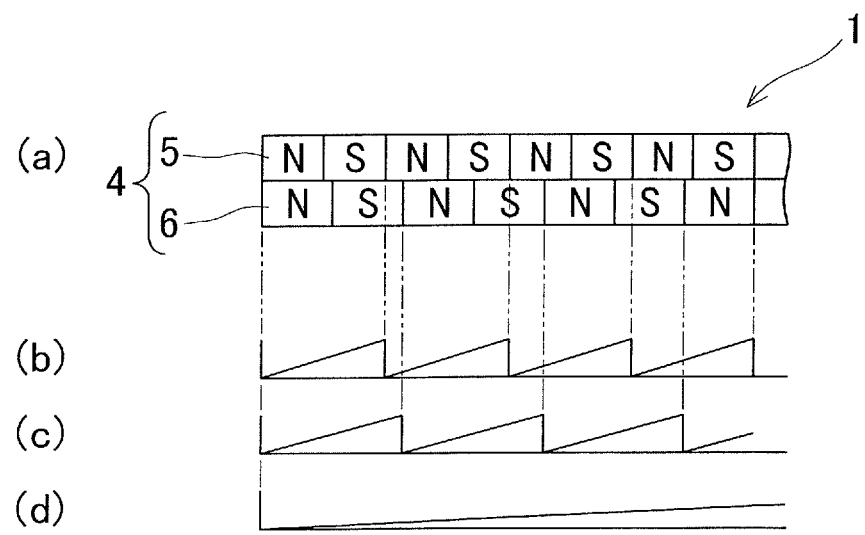
FIG. 2 shows function of the magnetic encoder where chart (a) thereof is a development showing an arrangement of magnetic poles of the magnetic encoder, charts (b) and (c) show waveforms of two signals obtained from two tracks of the magnetic encoder, and chart (d) shows a waveform of a phase difference between the two signals.

A first embodiment of the present invention will be described with reference to FIG. 1 to FIG. 7. The first embodiment is an example in which the present invention is applied to a radial type magnetic encoder. FIG. 1 is a cross-sectional view of the magnetic encoder. In FIG. 2, chart (a) shows magnetization patterns of magnetic tracks developed in the circumferential direction, charts (b) and (c) show detection signals corresponding to respective magnetic pole pairs in the magnetization patterns, and chart (d) shows a phase difference between the detection signals.

The magnetic encoder 1 is produced as follows. A rubber material, in which a magnetic powder is kneaded, is put in a mold together with a core member 2 of annular shape which may be a metal ring, and is bonded through vulcanization to the outer peripheral surface of the core member 2 to form an annular magnetic member 3. Alternatively, a core member 2 and a mixture of a plastic material and a magnetic powder are integrally molded to form an annular magnetic member 3 on the outer peripheral surface of the core member 2. Then, a plurality of rows (two rows in this embodiment) of magnetic tracks 4 having different numbers of magnetic pole pairs are formed on the surface of the magnetic member 3 that has not been magnetized.

The core member 2 is formed through press-molding of an iron-based rolled steel plate, and has a cylindrical portion 2A having an outer peripheral surface that serves as a track formation surface 2Aa, and a press-fitting portion 2B. The press-fitting portion 2B is composed of: a stepped portion 2Ba that bends from the cylindrical portion 2A toward the inner diameter side; and an inner-diameter press-fitting portion 2Bb that extends from an inner-diameter-side edge of the stepped portion 2Ba to a side opposite to the cylindrical portion 2A, concentrically with the cylindrical portion 2A, and that allows the rotary shaft 31 to be press-fitted and fixed thereto.

The magnetic member 3 is magnetized at, for example, 32 pole pairs with the magnetic track 4 on the side distant from the press-fitting portion 2B being a main track 5, while the magnetic member 3 is magnetized at, for example, 31 pole pairs with the magnetic track 4 on the side close to the press-fitting portion 2 being a sub track 6. This magnetic encoder 1 is used for detection of an absolute angle of rotation of a rotary shaft by utilizing the fact that a difference of one pole pair is generated per rotation.

For example, as magnetic sensors for absolute angle detection, magnetic sensors 34 and 35 are disposed so as to oppose the main track 5 and the sub track 6 of the magnetic encoder 1, respectively, and the magnetic encoder 1 is rotated around the center-of-annulus O. In this case, the detection signal shown in chart (b) of FIG. 2 is outputted from the magnetic sensor 34 on the main track 5 side while the detection signal shown in chart (c) of FIG. 2 is outputted from the magnetic sensor 35 on the sub track 6 side. Each detection signal is a signal in which one pair of an N pole and an S pole corresponds to a cycle from 0° to 360° in phase. By taking a difference between these detection signals, as shown in chart (d) of FIG. 2, a phase difference signal that linearly change of waveform is obtained with rotation of the magnetic encoder 1. In this case, with one rotation from 0° to 360° of the magnetic encoder 1, the phase difference signal indicates a waveform of one period.

In detecting an absolute angle by the magnetic encoder, an angle is calculated with high accuracy on the basis of the main track 5, and an absolute angle can be detected while recognizing the position of the main track based on the difference of the phase between the main track 5 and the sub track 6. It is noted that an absolute angle detection device is composed of: the magnetic encoder 1; the magnetic sensors 34 and 35; and an operation software or hardware (not shown) such as an electronic circuit that performs calculation of the absolute angle from the detection signals of the magnetic sensors 34 and 35.

Examples of magnetization methods include: a method of magnetizing the magnetic tracks 4 (5 and 6) in a predetermined order while rotating the magnetic encoder 1, by using an index magnetization device that magnetizes N poles and S poles alternately one by one; and one-shot magnetization in which both the magnetic tracks 4 (5 and 6) are simultaneously magnetized. Either method may be used. However, the one-shot magnetization complicates the structure of the magnetizing yoke and causes magnetic interference between the magnetic tracks 4 (5 and 6) during magnetization, which makes magnetization with high accuracy difficult. Therefore, the magnetization using the index magnetization device is preferred when the magnetic encoder 1 has a plurality of rows of magnetic tracks 4.

For example, in a case where an absolute angle is detected by using two rows of magnetic tracks 4 (5 and 6) that are magnetized with 32 pole pairs and 31 pole pairs, respectively (in this case, the number of the magnetic poles of the main track 5 is larger by one than the number of the magnetic poles of the sub track 6), an angle per pole pair on the 32 pole pairs side (main track 5 side) is 11.25° (360/32). In order to determine the present phase position, a magnetization accuracy of not more than 0.35° corresponding to one 32th of 11.25° (11.25/32), or, for the sake of safety, a magnetization accuracy within ±0.1°, is required. If the number of magnetic poles is increased to be, for example, 64 pole pairs and 63 pole pairs, the required accuracy becomes stricter. For example, a magnetization accuracy within ±0.04° is required.

Figure 3:
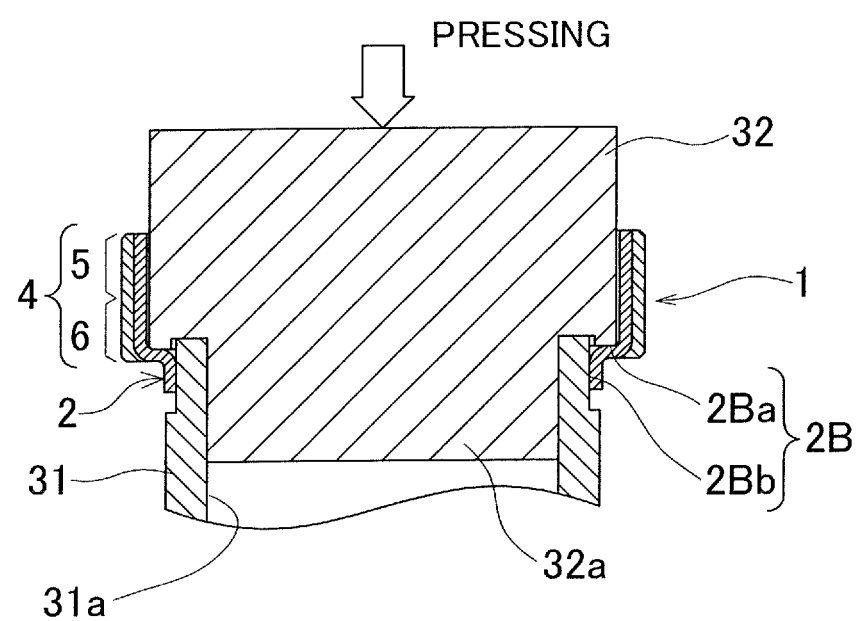
FIG. 3 is a longitudinal-sectional view showing a method for mounting the magnetic encoder to a rotary shaft.

FIG. 3 shows an example of a case where the magnetic encoder 1 is press-fitted and fixed to the rotary shaft 31. When the magnetic encoder 1 is press-fitted and fixed to the rotary shaft 31, the stepped portion 2Ba, of the press-fitting portion 2B, orthogonal to the axial center of the rotary shaft 31, is pressed by use of a press-fitting tool 32, whereby the inner-diameter press-fitting portion 2Bb of the core member 2 is press-fitted to one end portion of the rotary shaft 31, and the magnetic encoder 1 is fixed. During the press-fitting, in order to prevent the magnetic encoder 1 from being inclined with respect to the rotary shaft 31, a tip portion 32a of the press-fitting tool 32 is preferably guided along an inner-diameter portion 31a of the hollow rotary shaft 31.

Normally, a diametric tolerance range of the inner-diameter press-fitting portion 2Bb of the press-molded core member 2 is about 100 μm. Therefore, when the magnetic encoder 1 is press-fitted and fixed to the rotary shaft 31, an interference between the rotary shaft 31 and the inner-diameter press-fitting portion 2Bb of the core member 2 is set to about 100 μm to 200 μm. Also in this embodiment, the interference is set within this range. After the press-fitting, the magnetic track 4 close to the press-fitting portion 2B of the magnetic encoder 1 might be deformed. In this embodiment, since the magnetic track 4 on the side distant from the press-fitting portion 2B is magnetized as the main track 5 while the magnetic track 4 on the side close to the press-fitting portion 2B is magnetized as the sub track 6, likelihood of deformation of the main track 5 due to the press-fitting is minimized to avoid influence on the angular accuracy.

In a case where the main track 5 having the larger number of magnetic pole pairs to be used for calculation of an angle is magnetized first, when the sub track 6 is magnetized thereafter, leakage of a magnetic flux may affect the accuracy of the main track 5, e.g., a pitch error (pitch accuracy) or an accumulated pitch error (accumulated pitch accuracy) of the magnetic poles. In this case, the angular accuracy is reduced.

Each of the pitch error and the accumulated pitch error is an index indicating the accuracy of the magnetized track. For example, assuming that a magnetic track is magnetized with 32 pole pairs, an angle per pole pair is theoretically 11.25°. Then, if the angle of a certain pole pair is 11.3° in actuality, this pole pair has a pitch error of +0.05°. The accumulated pitch error is obtained by accumulating the pitch errors of all the pole pairs, and is represented by the maximum value (amplitude) thereof.

Therefore, the main track 5 having the larger number of magnetic pole pairs that affect the angular accuracy is magnetized last. Thus, degradation in accuracy of the main track 5 is inhibited, and an absolute angle can be detected with high accuracy. That is, since the aforementioned magnetization order is adopted, degradation in accuracy of the main track 5 is inhibited, the main track 5 is formed with higher pitch accuracy and higher accumulated pitch accuracy of the magnetic poles than those of the sub track 6. In this case, when the main track 5 is magnetized, this magnetization may affect the accuracy of the sub track 6 that has been magnetized first. However, since the sub track 6 is used for recognizing the phase relationship with the main track 5, the accuracy thereof need not be taken into much consideration.

Figure 4:
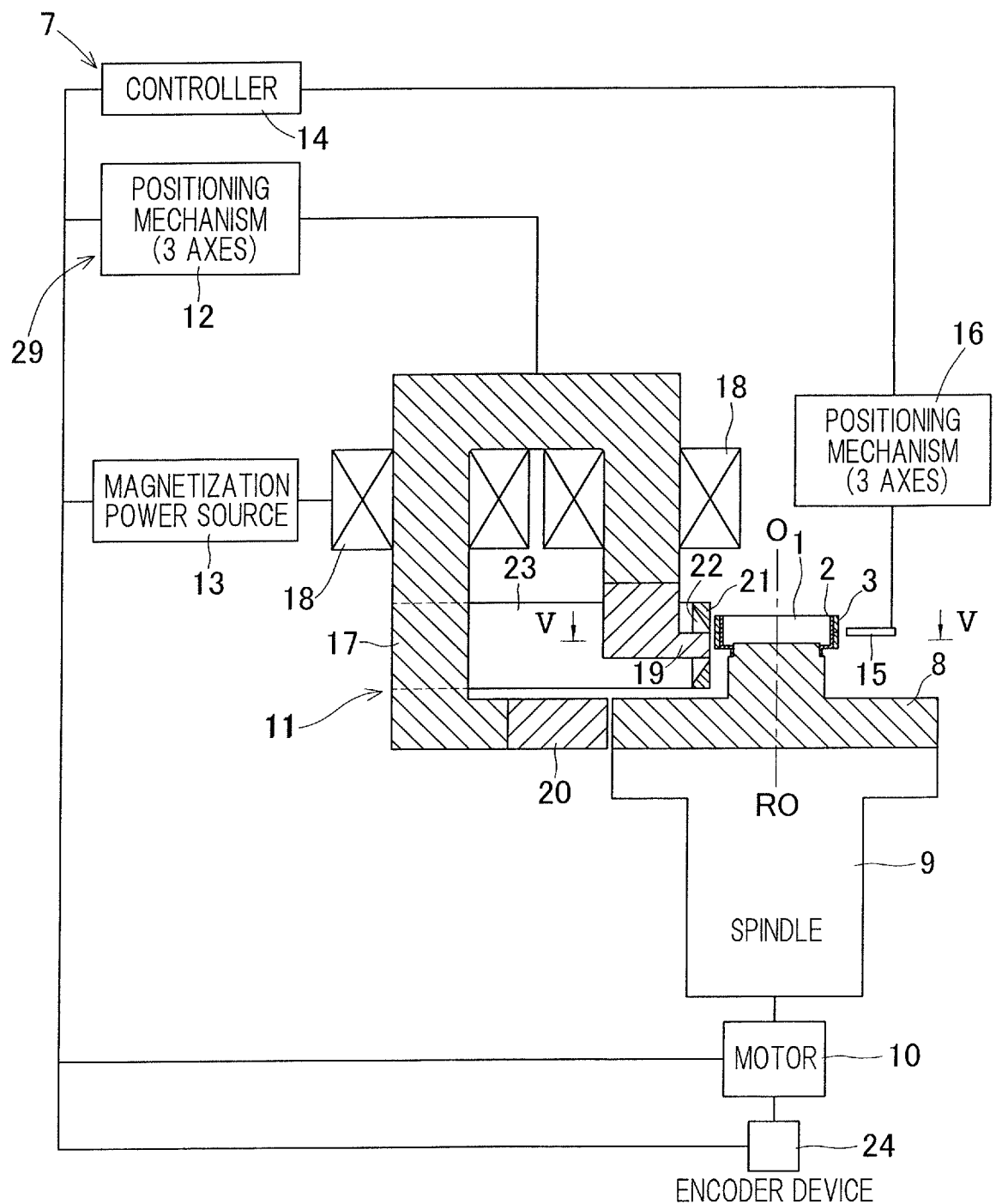
FIG. 4 is a longitudinal-sectional view of an example of a production apparatus for producing the magnetic encoder.
Figure 5:
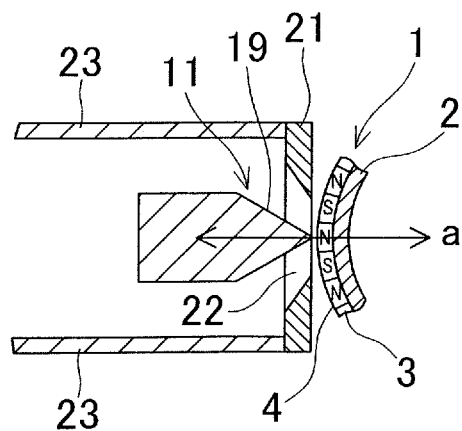
FIG. 5 is a cross-sectional view taken along a line V-V in FIG. 4 as viewed from above.

FIG. 4 shows a magnetization device. FIG. 5 is a cross-sectional view taken along a line V-V in FIG. 4. The magnetization device 7 of the magnetic encoder includes: a spindle 9 configured to cause a chuck 8 that holds an un-magnetized magnetic encoder 1 as a magnetization target to rotate, with the center-of-annulus O coinciding with the rotation axis RO; a motor 10 configured to rotate the spindle 9; a magnetizing yoke 11; a positioning mechanism 12 configured to position the magnetizing yoke 11 in three axial directions; a magnetization power source 13; and a controller 14. The motor 10 has a highly accurate encoder device 24 which is a detection device for detecting a rotation angle. The magnetization device 7 further includes a magnetic sensor 15 configured to measure magnetization accuracy when magnetization of the magnetic encoder 1 held by the chuck 8 is finished. The magnetic sensor 15 is fixed to a positioning mechanism 16 capable of positioning the magnetic sensor 15 in three axial directions. The motor 10, the spindle 9, and the positioning mechanism 12 of the magnetizing yoke 11 form a positioning device 29 configured to position a tip portion 19 of the magnetizing yoke 11 relative to the un-magnetized magnetic encoder 1. The controller 14 is implemented as a computer or the like. The controller 14 controls, through numerical control or the like, the magnetization power source 13, and the positioning mechanism 12 and the motor 10 of the positioning device 29 such that individual magnetic tracks 4 of the un-magnetized magnetic encoder 1 are sequentially magnetized, such that the main track 5 is magnetized after the sub track 6 with this order, and such that N magnetic poles and S magnetic poles are alternately arranged.

The magnetizing yoke 11 has a pair of opposed end portions (also referred to as tip portions) 19 and 20 that are magnetically opposed to each other across a magnetic gap. The magnetizing yoke 11 magnetizes the magnetic tracks 4 of the un-magnetized magnetic encoder 1 disposed at a predetermined position and in a predetermined attitude with respect to the opposed end portions 19 and 20. Specifically, the magnetizing yoke 11 is composed of a U-shaped magnetizing yoke body 17, an exciting coil 18, and a first tip portion 19 and a second tip portion 20 respectively provided at one end and the other end of the magnetizing yoke body 17. The exciting coil 18 is wound around the outer periphery of the magnetizing yoke body 17. The magnetizing yoke 11 causes a magnetic flux a (see FIG. 4), for magnetization, to penetrate the magnetic encoder 1. The first tip portion 19 of the magnetizing yoke 11 has a pointed end. During magnetization, the first tip portion 19 is opposed to the surface of the magnetic encoder 1 (i.e., the magnetic track 4). The second tip portion 20 is opposed to the chuck 8 with a gap therebetween, and a magnetic loop, which extends from the first tip portion 19 to the second tip portion 20 through the magnetic encoder 1 and the chuck 8, is formed. The second tip portion 20 may be omitted.

A magnetic shield member 21 has a rectangular hole 22 that has a tapered vertical cross section along the axis RO, and the first tip portion 19 is disposed with respective gaps above and below the hole 22. The magnetic shield member 21 and the first tip portion 19, each opposing the magnetic encoder 1, are positioned with a predetermined gap, e.g., about 0.1 mm, with respect to the un-magnetized magnetic track 4.

The magnetic shield member 21 is fixed to an end portion of a support base 23 that is fixed at a position close to the second tip portion 20 of the magnetizing yoke body 17. Of magnetic fluxes generated from the first tip portion 19, a magnetic flux that affects the other magnetic track 4 not to be magnetized is guided to the magnetic shield member 21 so as to be alleviated toward the second tip portion 20 on the opposite side from the first tip portion 19 that opposes the magnetic encoder 1. The magnetic shield member 21 and the support base 23 are formed of a magnetic body, e.g., a low-carbon steel material. In magnetizing the magnetic encoder 1 having the plurality of rows of magnetic tracks, the magnetic shield member 21 can be opposed to the magnetic track 4 so as to shield the flow of the magnetic flux to the magnetic track other than the magnetization target.

Figure 6:
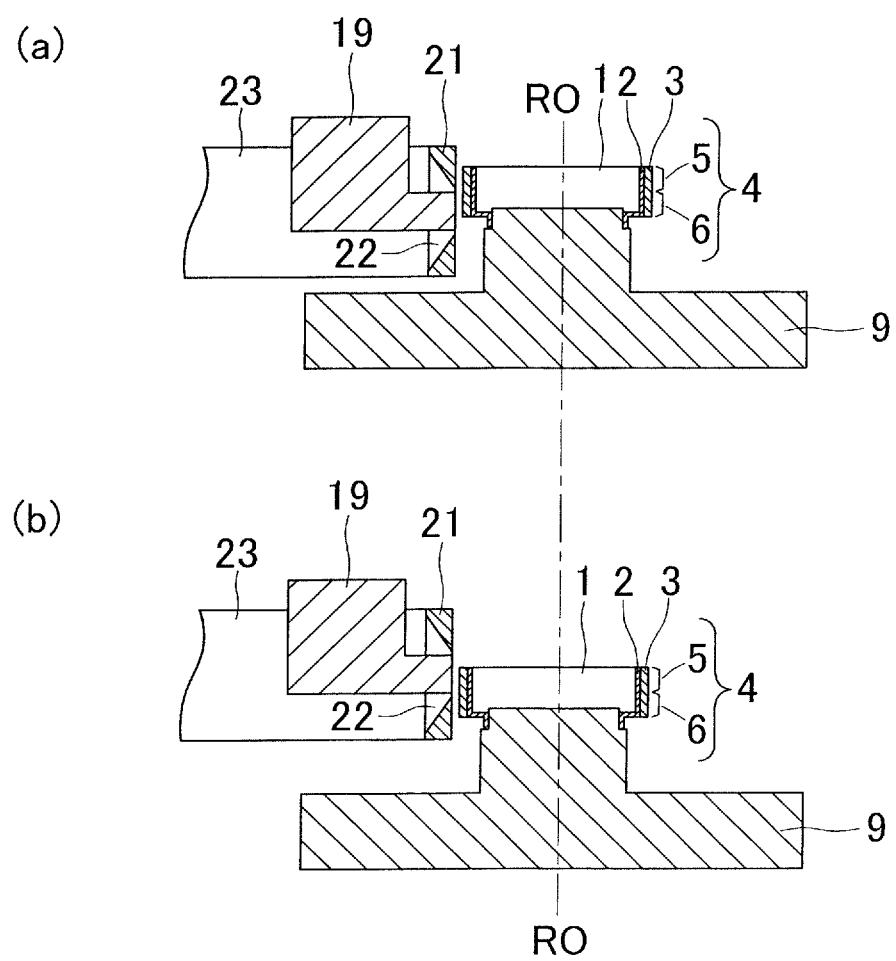
FIG. 6 is a longitudinal-sectional view showing magnetization steps of the magnetic encoder by the production apparatus where the step of chart (a) is followed by that of chart (b)
Figure 7:
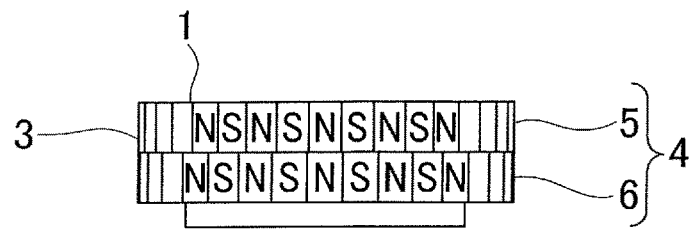
FIG. 7 shows arrangement of magnetic poles in a plurality of rows in the magnetic encoder.

FIG. 6 shows the position where the first tip portion 19 of the magnetizing yoke 11 is disposed when the two rows of magnetic tracks 4 (5 and 6) are magnetized to the magnetic member 3 of the un-magnetized magnetic encoder 1. FIG. 7 shows an example of a magnetization pattern of the magnetic encoder 1 magnetized in the two rows.

Specifically, chart (a) of FIG. 6 shows arrangement of the first tip portion 19 of the magnetizing yoke 11 and the magnetic shield member 21 in a case where the lower half of the magnetic member 3 of the magnetic encoder 1 is magnetized as the magnetic track 4 to be the sub track 6. In this case, the surface of the magnetic member 3, on which the other magnetic track 4 (main track 5) is to be formed, is covered with the magnetic shield member 21 to prevent the magnetic flux, which flows from the first tip portion 19, from flowing to the other magnetic track 4 (main track 5).

Meanwhile, chart (b) of FIG. 6 shows arrangement of the first tip portion 19 of the magnetizing yoke 11 and the magnetic shield member 21 in a case where the upper half of the magnetic member 3 of the magnetic encoder 1 is magnetized as the magnetic track 4 to be the main track 5. At this time, the surface of the magnetic member 3, on which the magnetic track 4 as the sub track 6 magnetized first has been formed, is covered with the magnetic shield member 21 to prevent the magnetic flux, which flows from the first tip portion 19, from flowing to the magnetic track 4 (sub track 6).

When magnetization is performed in an order such that the sub track 6 (magnetic track 4) is formed in the process shown in chart (a) of FIG. 6 and the main track 5 (magnetic track 4) is formed last in the process shown in chart (b) of FIG. 6, degradation in accuracy of the main track 5 is inhibited, whereby an absolute angle can be detected with high accuracy.

The magnetic encoder 1 according to the present embodiment has the plurality of rows of magnetic tracks 4 having different numbers of magnetic pole pairs from each other, as mentioned above, and the magnetic track 4 distant from the press-fitting portion 2B of the core member 2 serves as the main track 5 to be a reference of angle calculation while the magnetic track 4 close to the press-fitting portion 2B serves as the sub track 6 for detecting a phase position. Therefore, even when the magnetic encoder 1 is press-fitted to the rotary shaft 31, the main track 5 that is required to have high accuracy and has the larger number of magnetic pole pairs is less likely to be deformed due to the press-fitting, and degradation in the accuracy of a detected angle is avoided. Since the sub track 6 is the magnetic track 4 used for calculating a phase difference from the main track 5, influence of the accuracy of the magnetization pitch thereof is relatively small.

Since the main track 5 having the larger number of magnetic pole pairs that affect the angular accuracy is magnetized last, degradation in accuracy due to leakage of a magnetic flux is inhibited during magnetization of the main track 5, and therefore, reduction in the pitch accuracy of the main track 5 is relatively less than that of the sub track 6. In this regard, improvement of the accuracy of a detected angle is expected under the limited production technology. Thus, the magnetic encoder 1 can detect an absolute value with high accuracy.

Figure 8:
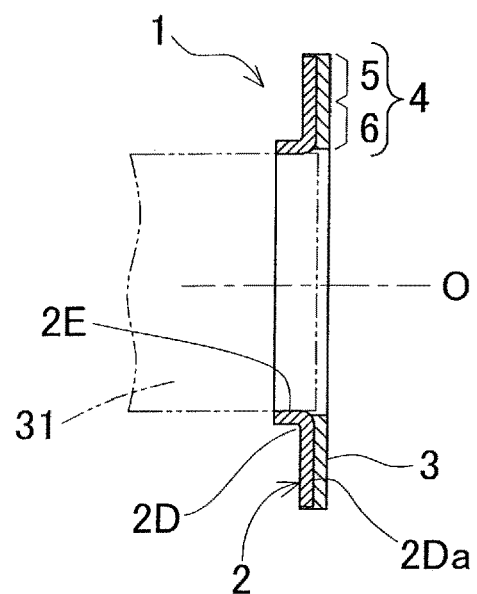
FIG. 8 is a longitudinal-sectional view of a magnetic encoder according to a second embodiment of the present invention.
Figure 9:
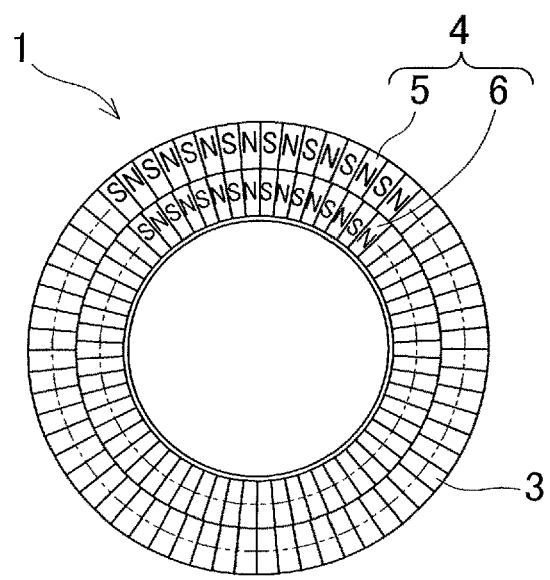
FIG. 9 is a front view showing arrangement of magnetic poles in the magnetic encoder.
Figure 10:
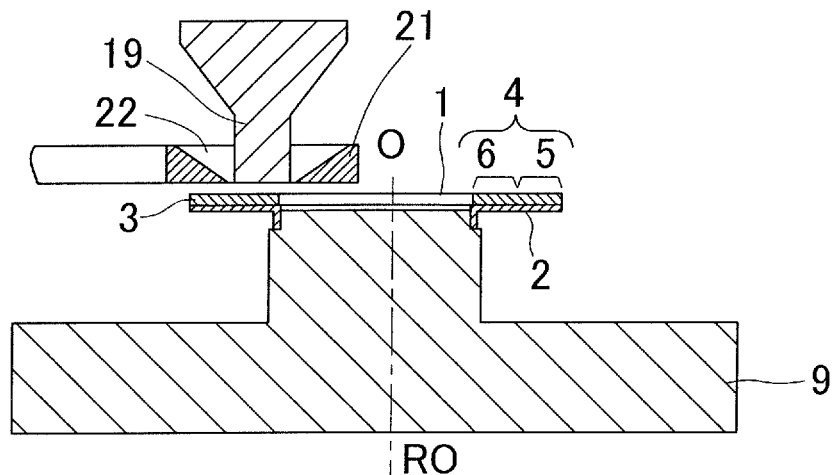
FIG. 10 shows a process of magnetizing the magnetic encoder while performing magnetic shielding.
Figure 10:
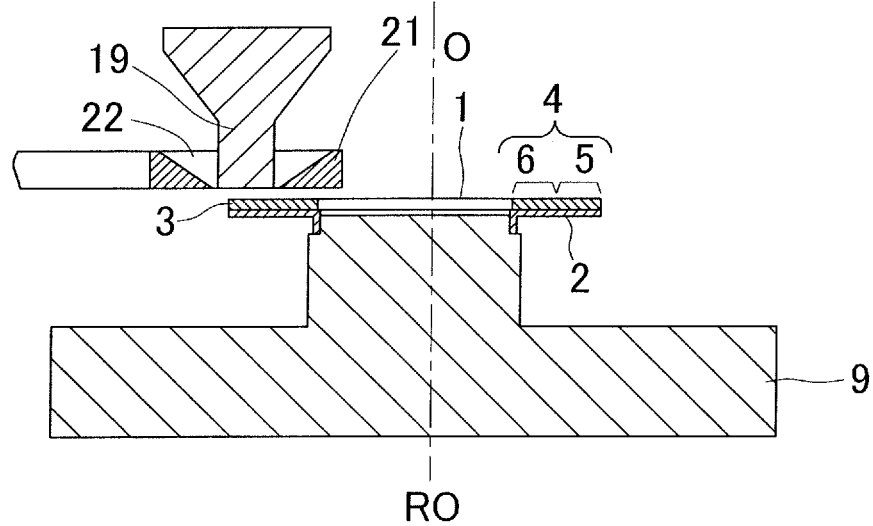

FIG. 8 to FIG. 10 show a second embodiment of the present invention. In this embodiment, the present invention is applied to an axial type magnetic encoder 1. The second embodiment is the same as the first embodiment described with reference to FIG. 1 to FIG. 7, except the features to be specifically described below. In this embodiment, the core member 2 has: an annular plate portion 2D having one surface that serves as a track formation surface 2Da; and a cylindrical press-fitting portion 2E that bends and extends from an inner-diameter-side edge of the plate portion 2D to a side opposite to the track formation surface 2Da.

The magnetic member 3 is provided on the track formation surface 2Da, and a plurality of rows of magnetic tracks 4 are provided on the magnetic member 3. In this case, one of the magnetic tracks 4, on the outermost peripheral side distant from the press-fitting portion 2E, serves as the main track 5 while the other magnetic track 4 servers as the sub track 6. The main track 5 and the sub track 6 are sequentially magnetized on the un-magnetized magnetic encoder 1 such that the sub track 6 is magnetized first and the main track 5 is magnetized last.

A device used for the above magnetization is basically the same as the magnetization device shown in FIG. 4 except that the direction in which the magnetic track 4 of the magnetic encoder 1 faces is the axial direction whereas the direction is the radial direction in FIG. 4. According to this difference, as shown in FIG. 10, the tip portion 19 of the magnetization yoke 11 and the magnetic shield member 21 face in the direction of the center-of-annulus O of the magnetic encoder 1 (FIG. 8), that is, in the direction of the rotary shaft axis RO (see charts (a) and (b) of FIG. 10). In addition, the direction, in which the magnetization yoke 11 and the magnetic shield member 21, used for switching the magnetic track 4 to be magnetized, move relative to the magnetic encoder 1, is the radial direction of the magnetic encoder 1 as shown in charts (a) and (b) of FIG. 10 which show the respective positioning states.

Also in this configuration, the magnetic track 4 on the side distant from the press-fitting portion 2E of the core member 2 is the main track 5 that is required to have high accuracy and has the larger number of magnetic pole pairs, which contributes to improvement and stability of angular accuracy. Further, in magnetizing the magnetic encoder 1 having the plurality of rows of magnetic tracks 4, the main track 5 as the magnetic track 4 for calculating an angle is magnetized last, whereby degradation in accuracy of the main track 5 is inhibited, and an absolute angle can be detected with high accuracy.

Although the present invention has been fully described in connection with the preferred embodiments thereof with reference to the accompanying drawings, numerous additions, changes, or deletions can be made without departing from the gist of the present invention. Therefore, such additions, changes, and deletions are also construed as included within the scope of the present invention.

REFERENCE NUMERALS

1 . . . magnetic encoder
2 . . . core member
2Aa . . . track formation surface
2A . . . cylindrical portion
2B . . . press-fitting portion
2Ba . . . stepped portion
2Bb . . . inner-diameter press-fitting portion
2D . . . plate portion
2Da . . . track formation surface
2E . . . press-fitting portion
3 . . . magnetic member
4 . . . magnetic track
5 . . . main track
6 . . . sub track
7 . . . magnetization device of magnetic encoder
8 . . . chuck
10 . . . motor
11 . . . magnetizing yoke
12 . . . positioning mechanism
13 . . . magnetization power source
14 . . . controller
19 . . . tip portion
21 . . . shield member
29 . . . positioning device
31 . . . rotary shaft

What is claimed is:

1. A magnetic encoder, comprising:
a core member of annular shape including a track formation surface and a press-fitting portion to which a rotary shaft is press-fitted and fixed, the press-fitting portion bending and extending from an edge of the track formation surface; and
two or more rows of magnetic tracks arranged adjacent to each other on a magnetic member provided on the track formation surface of the core member, each track having N poles and S poles alternately magnetized thereon,
wherein
the two or more rows of magnetic tracks include a main track that has a largest number of magnetic poles and is used for calculating an angle of rotation, and a sub track used for calculating a phase difference from the main track, and
the main track is located on a side more distant from the press-fitting portion than the sub track so as to suppress accuracy reduction.

2. The magnetic encoder as claimed in claim 1, wherein the core member includes:
a cylindrical portion having an outer peripheral surface that serves as the track formation surface, and
the press-fitting portion, and
the press-fitting portion includes:

a stepped portion that bends from the cylindrical portion toward an inner diameter side, and an inner-diameter press-fitting portion that extends from an inner-diameter-side edge of the stepped portion to a side opposite to the cylindrical portion, concentrically with the cylindrical portion, and that allows the rotary shaft to be press-fitted and fixed thereto.

3. The magnetic encoder as claimed in claim 2, wherein at least a portion of the sub track overlaps with the stepped portion in a radial direction of the core member, and an outer side of the sub track, which faces in an axial direction the core member, is substantially flush with an outer side of the stepped portion that faces in the axial direction of the core member.

4. The magnetic encoder as claimed in claim 1, wherein the core member includes:

a plate portion of ring shape having one surface that serves as the track formation surface, and the press-fitting portion, and the press-fitting portion bends and extends from an inner-diameter-side edge of the plate portion to a side opposite to the track formation surface.

5. The magnetic encoder as claimed in claim 4, wherein at least a portion of the sub track overlaps with the press-fitting portion in the axial direction of the core member, and a side of the sub track, which faces toward an inner diameter of the core member, is substantially flush with a side of the press-fitting portion that faces toward the inner diameter of the core member.

6. The magnetic encoder as claimed in claim 1, wherein accuracy of pitch of magnetic poles is higher in the main track than in the sub track.

7. A method for producing the magnetic encoder as claimed in claim 1, the method comprising:

producing an un-magnetized magnetic encoder in which the magnetic member is provided on an outer periphery of the core member; and sequentially magnetizing the respective rows of magnetic tracks in such a manner that, during the magnetization, N poles and S poles are alternately magnetized one by one while shielding, with a magnetic shield member, a magnetic track or a portion to be a magnetic track, which is not currently being magnetized.

8. The method for producing a magnetic encoder as claimed in claim 7, wherein the main track is magnetized after the sub track has been magnetized.

9. The method for producing a magnetic encoder as claimed in claim 7, wherein shielding, with the magnetic shield member, the magnetic track or the portion to be the magnetic track, which is not currently being magnetized, includes positioning the magnetic shield member to be spaced apart from the magnetic encoder by a predetermined gap.

10. The method for producing a magnetic encoder as claimed in claim 9, wherein the magnetic shield member is fixed to an end portion of a support base, and the method further comprises:

providing the support base to be located at a first position relative to the magnetic encoder and magnetizing a lower portion of the magnetic member to form the sub track while covering an upper portion of the magnetic member with the magnetic shield member; and providing the support base to be located at a second position relative to the magnetic encoder and magnetizing the upper portion of the magnetic member to form the main track while covering the lower portion of the magnetic member, on which the sub track has been formed, with the magnetic shield member.

11. The magnetic encoder as claimed in claim 1, wherein the track formation surface includes a continuous planar surface flush with the main track and the sub track.

* * * * *